US005878002A

United States Patent [19]

Pfeil

[11] Patent Number: 5,878,002

[45] Date of Patent: Mar. 2, 1999

[54] TACTILE ACTUATED ELECTRONIC COMPUTER WRIST WATCH

[76] Inventor: William Pfeil, Box 317, Kaunakakai, Hi. 96748

[21] Appl. No.: 50,100

[22] Filed: Mar. 30, 1998

[51] Int. Cl.$^{6}$ .......................... G04B 47/00; G04C 17/00; G04C 19/00; G06F 3/00

[52] U.S. Cl. ................................ 368/10; 368/69; 368/82; 364/705.07; 364/709.11

[58] Field of Search ................................ 368/10, 69, 70, 368/82, 239, 185–187; 364/705.01, 705.07, 709.01, 709.11, 710.01

[56] References Cited

U.S. PATENT DOCUMENTS

| | | |
|---|---|---|
| D. 244,012 | 4/1977 | Cake et al. . |
| D. 264,561 | 5/1982 | Sasaki . |
| D. 296,083 | 6/1988 | Morishima . |
| D. 337,057 | 7/1993 | Demarse . |
| D. 358,997 | 6/1995 | Yamamoto . |
| D. 358,998 | 6/1995 | Sugita . |
| D. 361,280 | 8/1995 | Hanagata . |
| 3,803,834 | 4/1974 | Reese . |
| 4,019,037 | 4/1977 | Monna . |
| 4,022,014 | 5/1977 | Lowdenslager . |
| 4,041,295 | 8/1977 | Ido et al. . |
| 4,044,242 | 8/1977 | Laesser . |
| 4,062,181 | 12/1977 | Zurcher . |
| 4,093,992 | 6/1978 | Kawamura et al. . |
| 4,120,036 | 10/1978 | Maeda et al. . |
| 4,232,382 | 11/1980 | Heinsen et al. . |
| 4,240,150 | 12/1980 | Ebihara et al. . |
| 4,266,278 | 5/1981 | Ebihara et al. . |
| 4,268,913 | 5/1981 | Nakagiri et al. . |
| 4,300,201 | 11/1981 | Maeda et al. . |
| 4,552,464 | 11/1985 | Rogers . |

*Primary Examiner*—Vit Miska
*Attorney, Agent, or Firm*—Barnes & Thornburg

[57] ABSTRACT

A tactilely setable data input structure for a battery-operated, computer-run wrist watch operable in a time mode and a calculator mode comprising: a watch casing housing battery and clock calculator electronics and at least one visible display having multiple units therein. A first button is located on a first side edge of the housing for operating the electronics to cause the visible display to shift between a calculator and a time display upon depression thereof. A second and third button on said first side edge of the housing and a fourth, fifth and sixth button on an opposite side edge of the housing from the first edge. The second through sixth buttons are connected to the electronics to create digits zero through nine or no digit in a first unit of the display dependent on the combination of specific buttons simultaneously pressed, wherein at least two of the digits zero through nine are created by the pressing of only two buttons, and wherein release of the buttons creating the digit shifts the register to an adjoining unit of the display for creation of a digit in a second unit of the register; and wherein pressing of different button combinations from those creating the digits zero to nine, activates the calculator electronics to any one of the mathematical functions of adding, subtracting, dividing or multiplying digits previously entered into the display by a subsequent sequence of digits to be entered into the display, and wherein entry of a new number after release of these different button combinations initially clears the display to allow for the insertion of the new number.

22 Claims, 4 Drawing Sheets

TACTILE ACTUATED ELECTRONIC COMPUTER WRIST WATCH

BACKGROUND AND SUMMARY

This invention relates to electronic wrist watches with calculator mechanisms and provides for a six-button operation of all time and calculator functions. By locating three buttons on each side of the wrist watch casing, an operator can operate the watch tactilely without viewing of the watch. By utilizing simultaneous pressing of specific buttons, all watch and calculator functions and entry can be handled by the pressing of between one to three buttons, a task easily done with a user's thumb, index and forefinger.

Electronic wrist watches with built-in calculators are well-known as evidenced by U.S. Pat. Nos. 4,266,278 of May 5, 1981 to Ebihara et al.; 4,232,382 of Nov. 4, 1980 to Heinsen et al.; 3,803,834 of Apr. 16, 1974 to Reese; 4,086,655 of Apr. 25, 1978 to Taiminmoto et al.; and 4,062,181 of Dec. 13, 1977 to Zurcher. These calculating wrist watches all suffer from the fact that the keyboard for numeral entry and mathematic functions (add, subtract, multiply, divide,=) is equipped with a plurality of closely spaced buttons on the face of the watch. Each number and each function has its own button. Consequently, as the buttons are close together, great care must be exhibited in data entry to insure accuracy. In addition, when buttons are close together, sometimes a tool (e.g., a pencil point, paper clip end, etc.) has to be used for pressing the buttons as a user's finger is too wide to insure only pressing of a single button. Likewise, viewing of the individual buttons is required in order to insure proper entry of data or mathematical function.

It is well-known in watches to have dual time zone capability for travelers so they can get one clock register for home time and one clock register for local time. By pressing of a button, the watch display can shift between these clock registers. Quite often, home time utilizes a twelve-hour AM-PM clock while the local time utilizes a twenty-four hour clock. It is also well-known to include a stopwatch register in these electronic watches, and by the proper pushing of buttons, one can shift from time to stopwatch operation. Also alarm setting features are quite common in these watches.

It is also well-known to include memory registers in calculators for the storage of numbers, such that e.g., multiplication of a series of different numbers by a constant number can be obtained by reference to a constant number stored in the memory.

In the above time and calculator functions, a method and procedure for the input of data and the change of function is normally obtained by the pushing of individual buttons for digit entry and individual buttons for shifting between registers and functions.

The instant invention accomplishes the data input for the above types of watches by shifting between registers and function with simplicity utilizing only six buttons which are spaced far apart so as to be able to be easily pushed by the thumb, fore and index fingers of one hand. By providing for no more than the pushing of three keys to accomplish data input, register recall, and mathematical and time function and display, tactile operation of the wrist watch can be affected so that the user need not view the watch face for data entry, register recall, mathematical or time function selected. By having the data entry utilize buttons on opposite sides of the watch face, a squeezing action of buttons between a thumb and fingers of a hand is obtained, which renders actuation easily and tactilely.

Rapid action is obtained by memorizing the buttons for actuation. This is of course simpler than a typewriter keyboard since fewer discrete combinations are required.

A type of electronics to obtain such operations can be found in U.S. Pat. No. 4,158,285 to Heinsen et al. which type of electronics can be utilized with the instant invention and which electronics is incorporated by reference hereinto as an example of electronics necessary to operate a watch calculator of the above known type. The instant application is not dependent on the electronics to be used, but rather with a logic system that allows tactile input to such electronics.

DETAILED DESCRIPTION OF A PREFERRED EMBODIMENT

Figure 1:
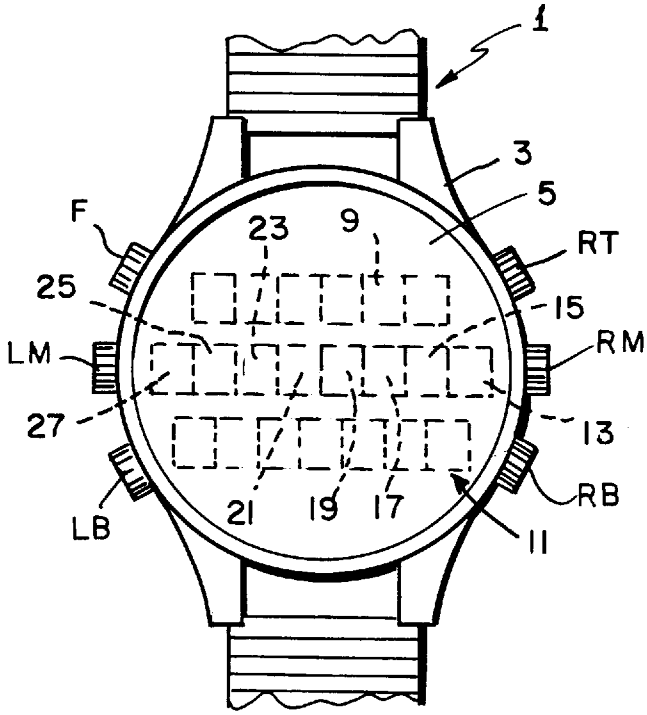
FIG. 1 shows a watch face with the six-button data and function input of the instant invention.

FIG. 1 shows a wrist watch 1 having a casing 3, dial face 5 and main display register 7. The main register 8 has a plurality of units 13, 15, 17, 19, 21, 23, 25, 27. Also shown in dotted lines are two additional display registers 9 and 11. In some installations utilizing my invention only one display register will appear while in the other installations, multiple display registers can be used. For example, if it is desired that the watch displays a calendar along with time, the register 9 could show the calendar and the register 11 the time. Alternatively, one could, by proper button movement, switch register 7 between calendar and time. In a dual time zone configuration, a calendar could appear at display register 9 local time at display register 7, and home time at register 11.

The number of display registers to be provided is limited only by space on the watch and the watch designer's choice as to what simultaneous displays it is desired to be shown at one time.

The watch of FIG. 1 is provided with six inputs and function buttons, three on the left side of the casing 3 to be operated by the thumb of a user's right hand and three buttons on the right of the casing to be operated by the fore and index fingers of a user's right hand.

The buttons are described as follows: At the top left side of the casing is button F, the main function controlling button. Also on the left side of the casing are left middle button LM and left bottom button LB. On the right side of the watch casing 3 are right top button RT, right middle button RM and right bottom button RB. An exemplary functioning and logic of the buttons is explained below and the logic therefor is diagrammatically shown in FIGS. 2–4.

This exemplary operation shows a single time mode, calculator and stopwatch wherein a memory register is provided for the calculator mode.

Figure 2:
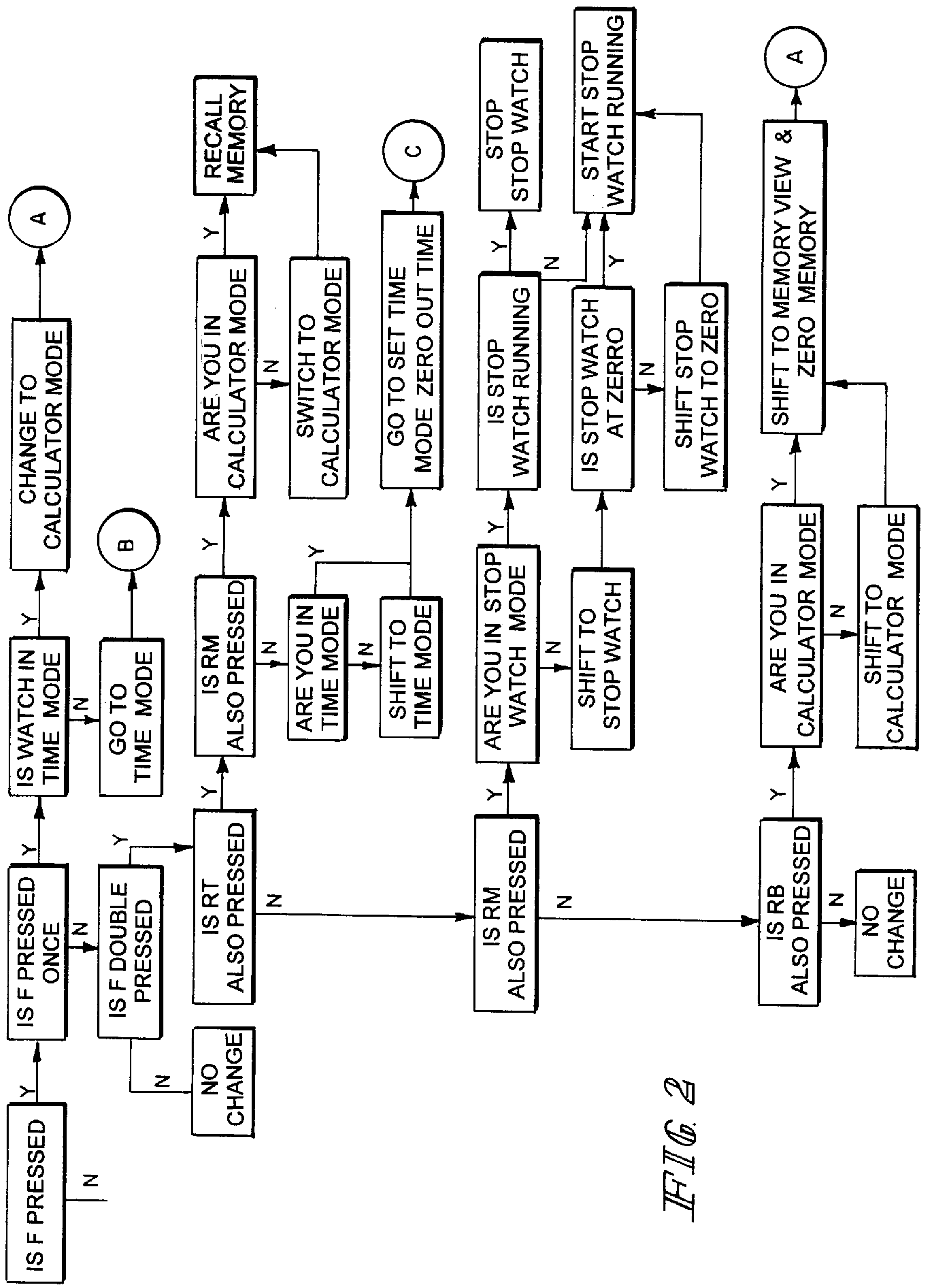
FIG. 2 shows a logic diagram for changing between registers.
Figure 3:
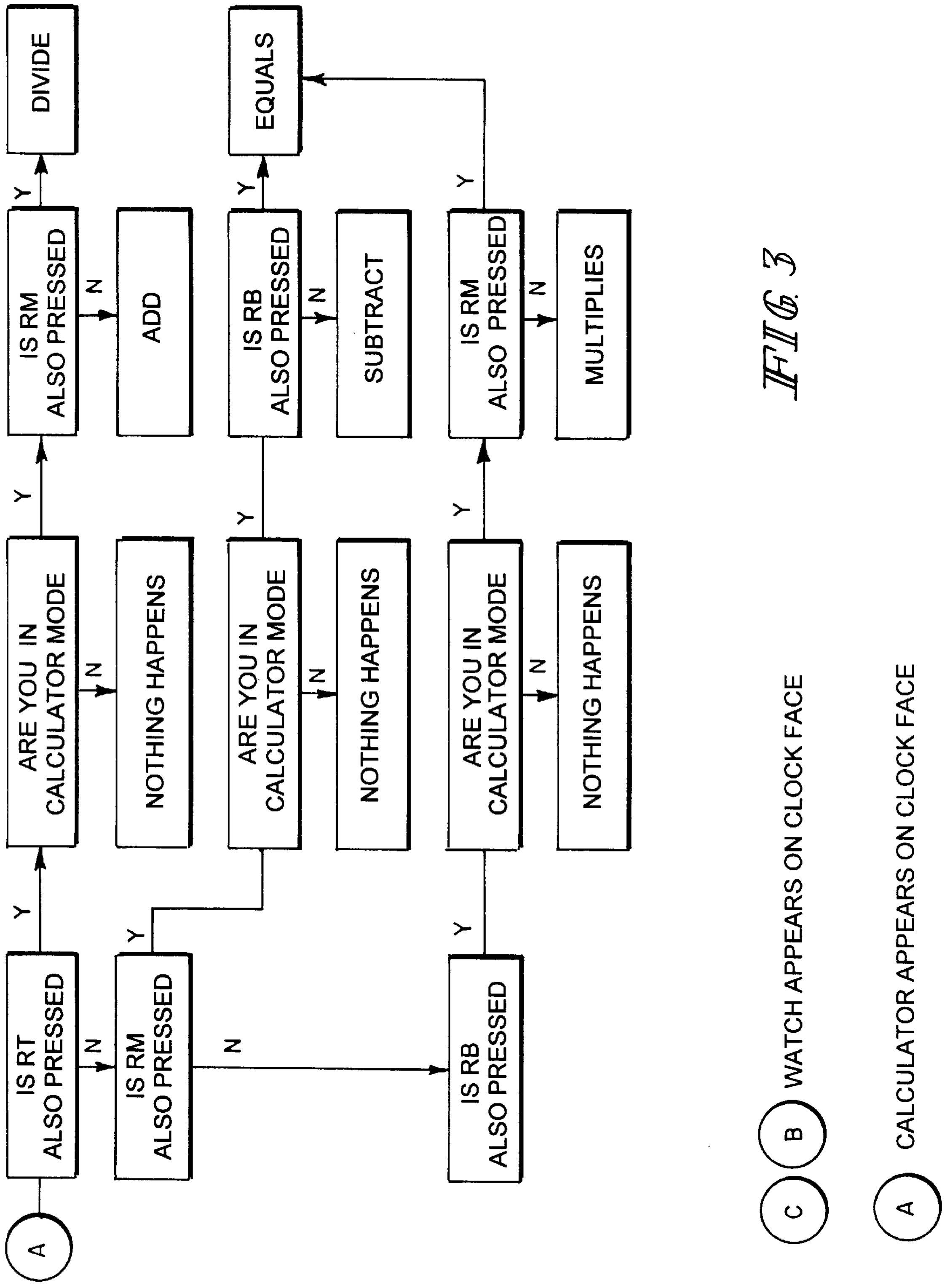
FIG. 3 shows a logic diagram with different mathematical functions.
Figure 4:
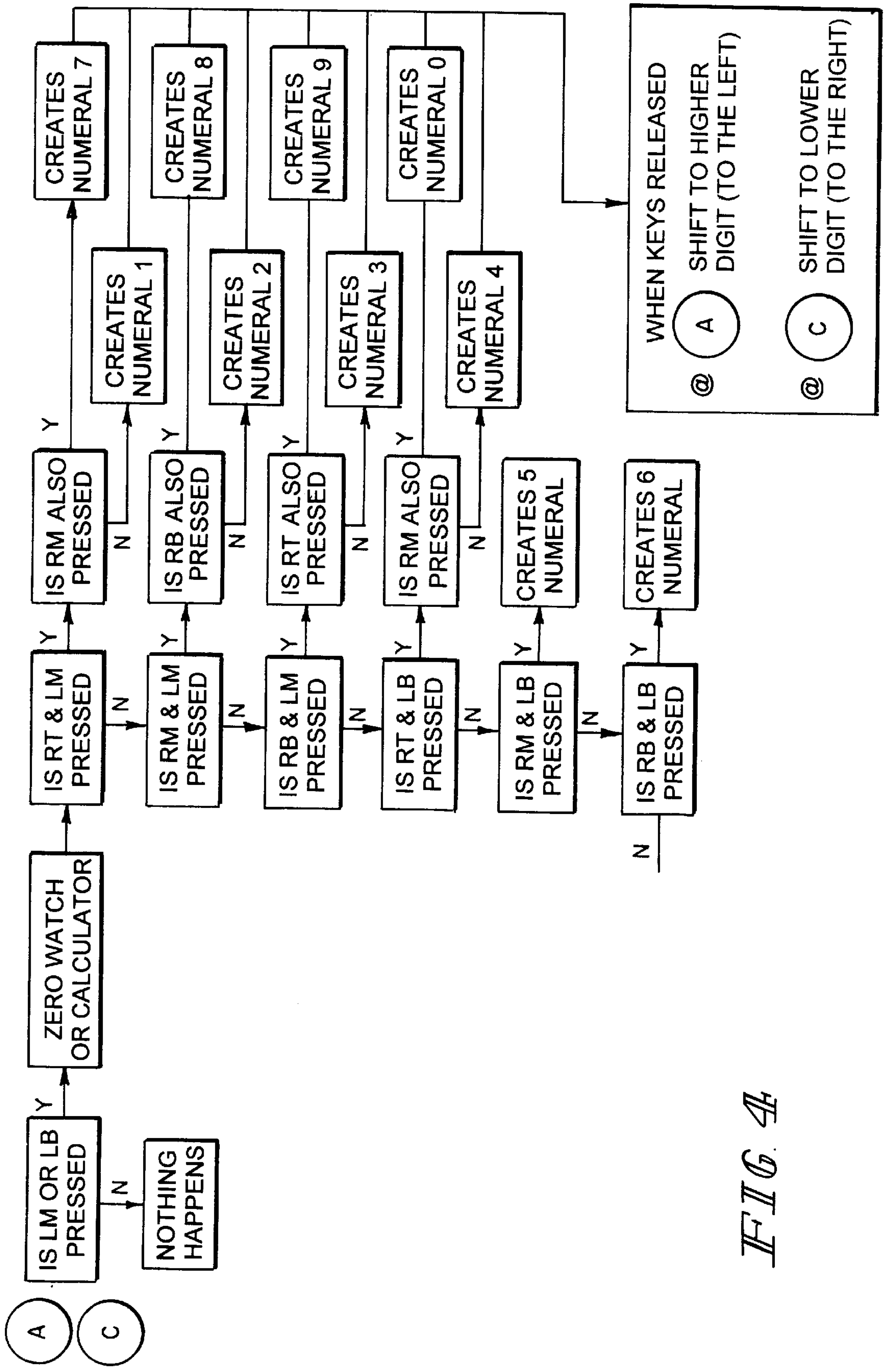
FIG. 4 shows a logic diagram for the insertion of numbers into each digit of a register.

In operation a sample program of FIGS. 2–4 would be:

| Left Buttons | Right Buttons Pressed Simultaneously | Output |
|---|---|---|
| F | None | Shifts between time and calculator operations when pushed once. |
| LM | RT | Creates numeral 1 |
| LM | RM | Creates numeral 2 |
| LM | RB | Creates numeral 3 |
| LB | RT | Creates numeral 4 |
| LB | RM | Creates numeral 5 |
| LB | RB | Creates numeral 6 |
| LM | RT and RB | Creates numeral 7 |
| LM | RM and RB | Creates numeral 8 |
| LB | RT and RM | Creates numeral 9 |
| LB | RM and RB | Creates numeral 10 |

FIG. 4 shows this in logic display format wherein Ⓐ is when button F sets calculator mode and Ⓑ when button F sets time mode. Register display 7 has eight units 13–27. In a time mode the two left units 24 and 27 signify hours. The two middle units 19 and 21 signify minutes. The two right units signify seconds. The separating units can be blank, colons, etc. In the time set mode, entry can be from the left wherein hours are set first by digit, where the digit for unit 27 is entered first and when the buttons therefor are released, the input shifts to unit 25 for the second digit of the hour. Then minutes are entered into units 21 and 19. Seconds could be entered in units 15 and 13 or these units could always RUN and be ignored and time setting. Alternatively, they could be at zero seconds and start when the minute entry is released. As one mode of operation for the hour setting, hours can be inserted using a twenty-four hour input (3 PM would be 15 hours) wherein the calculator mechanism automatically converts inputs of thirteen and above into twelve-hour AM-PM time or alternatively, the watch could be designed to only input hours one through twelve. Alternatively, the watch could be shifted between a twelve and twenty-four hour operation automatically by the electronics, based on a time delay of how long the button F is held depressed. If a twelve-hour display is utilized, an extra display on the watch face (not shown) could indicate AM or PM if desired as is standard in the industry.

As shown at the bottom right of FIG. 4, entry in the calculator mode is from right to left e.g., the number 837 would have the 7 entered first, the 3 entered second, and the 8 entered last. Alternatively, the electronics could be designed to shift the entered number to the left (from the unit to the ten's position) if a second digit were to be entered so that the number 837 would have the 8 entered first and when the 3 was to be entered, the 8 would shift one unit to the left to be 80 and the 3 entered in the unit area. Then the attempted entry of the 7 would automatically shift the 8 to the hundreds, and the 3 to 30 with the 7 being entered into the units area.

The particular register (time, stopwatch, memory) is obtained by a double pressing of the F button in combination with constant pressing of one or more of the right-hand buttons. As shown in FIG. 2, the following button sequence is utilized:

| Left Button Pressed Twice | Right Buttons Pressed Simultaneously | Output |
|---|---|---|
| F | RT | Set time |
| F | RM | Stopwatch |
| F | RB | Add memory |
| F | RT and RB | Recall memory |

The exemplary showing of FIG. 2 does not provide for dual time zones or alarms. However, such could be provided easily by the following as an example:

| Left Button Pressed Twice | Right Buttons Pressed Simultaneously | Output |
|---|---|---|
| F | RT and RM | Dual time register |
| F | RM and RB | Alarm set |
| F | None | Turn off alarm if ringing |

The initiating of mathematical functions are shown in FIG. 3 and are obtained as follows when the watch is in the calculating mode:

| Buttons on Left | Buttons on Right Pressed Simultaneously | Output |
|---|---|---|
| F | RT | Initiates adding |
| F | RM | Initiates subtracting |
| F | RB | Initiates multiplying |
| F | RT and RM | Initiates dividing |
| F | RM and RB | Initiates equal |

The above operation provides but one set of button combinations to provide the desired tactile operation. With six buttons, various simultaneous combinations thereof could be utilized other than the specific combinations shown. Of importance is the ability to limit inputs to a combination of three or less buttons in a tactile manner to accomplishing all tasks.

It is also contemplated that in time set mode or in the data entry calculating mode, that when all units in a register show zeros, the electronics will cause a chime to ring. This will indicate to the user that no data is present in the register and the register is ready for input. An automatic zeroing operating could be called for by a special button operation such as pressing button F simultaneously with all three right-hand buttons RT, RM and RB. Different tones for the chime could be used for the calculator, stopwatch, dual time, regular time, etc.

In the calculating mode, digits entered remain until the function entry is released. So, to multiply 83 by 124, the following steps occur: 8 and then 3 are entered (or vice versa depending on the design chosen) with the digits remaining in view. When the multiplication entry occurs, the digits remain viewable until the multiplication function input is released and then shifting to another register occurs for the entry of 124. After entry of 124, the=entry occurs and the multiplication takes effect by electronics and the result remains visible until the next entry occurs.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A tactilely setable data input structure for a battery-operated, computer-run wristwatch operable in a time mode and a calculator mode comprising:

a watch casing housing battery and clock calculator electronics and at least one visible display having multiple units therein;

a first button on a first edge of the housing for operating the electronics to cause the visible display to shift between a calculator and a time display upon depression thereof;

a second and third button on said first edge of the housing;

a fourth, fifth and sixth button on an opposite edge of the housing from the first edge;

the second through sixth buttons being connected to the electronics to create digits zero through nine or no digit in a first unit of the display dependent on the combination of specific buttons simultaneously pressed, wherein at least two of the digits zero through nine are created by the pressing of only two buttons, and wherein release of the buttons creating the digit shifts the register to an adjoining unit of the display for creation of a digit in a second unit of the register; and wherein pressing of different button combinations from those creating the digits zero to nine, activates the calculator electronics to any one of the mathematical functions of adding, subtracting, dividing or multiplying digits previously entered into the display by a subsequent sequence of digits to be entered into the display, and wherein entry of a new number after release of these different button combinations initially clears the display to allow for insertion of the new number.

2. The tactile input structure of claim 1, wherein the first button is pushed simultaneously with at least a selective one of buttons three through six to initiate an add, subtract, multiply, divide or equals mathematical function for the electronics.

3. The tactile input device of claim 1, wherein the electronics include a memory register and wherein double pushing of the first button while simultaneously pushing of at least a selective one of the buttons two through six will initiate either an add memory or recall memory mathematical function for electronics.

4. The tactile input device of claim 2, wherein the electronics include a memory register and wherein double pushing of the first button while simultaneously pushing of at least a selective one of the buttons two through six will initiate either an add memory or recall memory mathematical function for electronics.

5. The tactile input of claim 1, wherein the electronics include a stopwatch function and wherein double pushing of the first button simultaneously with pushing a selective one of the buttons two through six will initiate and terminate operation of the stopwatch function for the electronics.

6. The tactile input of claim 2, wherein the electronics include a stopwatch function and wherein double pushing of the first button simultaneously with pushing a selective one of the buttons two through six will initiate and terminate operation of the stopwatch function for the electronics.

7. The tactile input of claim 3, wherein the electronics include a stopwatch function and wherein double pushing of the first button simultaneously with pushing a selective one of the buttons two through six will initiate and terminate operation of the stopwatch function for the electronics.

8. The tactile input of claim 4, wherein the electronics include a stopwatch function and wherein double pushing of the first button simultaneously with pushing a selective one of the buttons two through six will initiate and terminate operation of the stopwatch function for the electronics.

9. The tactile input of claim 1, wherein any initiated operations of the electronics except for shifting between calculator and time displays can be obtained by the pushing of two or three buttons simultaneously.

10. The tactile input of claim 2, wherein any initiated operations of the electronics except for shifting between calculator and time displays can be obtained by the pushing of two or three buttons simultaneously.

11. The tactile input of claim 3, wherein any initiated operations of the electronics except for shifting between calculator and time displays can be obtained by the pushing of two or three buttons simultaneously.

12. The tactile input of claim 4, wherein any initiated operations of the electronics except for shifting between calculator and time displays can be obtained by the pushing of two or three buttons simultaneously.

13. The tactile input of claim 5, wherein any initiated operations of the electronics except for shifting between calculator and time displays can be obtained by the pushing of two or three buttons simultaneously.

14. The tactile input of claim 6, wherein any initiated operations of the electronics except for shifting between calculator and time displays can be obtained by the pushing of two or three buttons simultaneously.

15. The tactile input of claim 7, wherein any initiated operations of the electronics except for shifting between calculator and time displays can be obtained by the pushing of two or three buttons simultaneously.

16. The tactile input of claim 8, wherein any initiated operations of the electronics except for shifting between calculator and time displays can be obtained by the pushing of two or three buttons simultaneously.

17. The tactile input of claim 1, wherein the electronics include an audio signal that is created when the units in the display all show zero.

18. The tactile input of claim 1, wherein the audio signal for the time display is a different audio signal from the calculator display.

19. The tactile input of claim 1, wherein all functions and inputs to the wrist watch can each be obtained by the depression of no more than three buttons, albeit different buttons for different functions and inputs.

20. The tactile input of claim 2, wherein all functions and inputs to the wrist watch can each be obtained by the depression of no more than three buttons, albeit different buttons for different functions and inputs.

21. The tactile input of claim 3, wherein all functions and inputs to the wrist watch can each be obtained by the depression of no more than three buttons, albeit different buttons for different functions and inputs.

22. The tactile input of claim 5, wherein all functions and inputs to the wrist watch can each be obtained by the depression of no more than three buttons, albeit different buttons for different functions and inputs.

* * * * *